Sept. 4, 1956 G. H. KOCH 2,761,983
BRUSH SHIFTING DEVICE FOR CONTROLLING
SPEED OF AN ELECTRIC MOTOR
Filed June 24, 1955 2 Sheets-Sheet 1

INVENTOR
GUSTAV H. KOCH
BY *R. J. Eisinger*
ATTORNEY

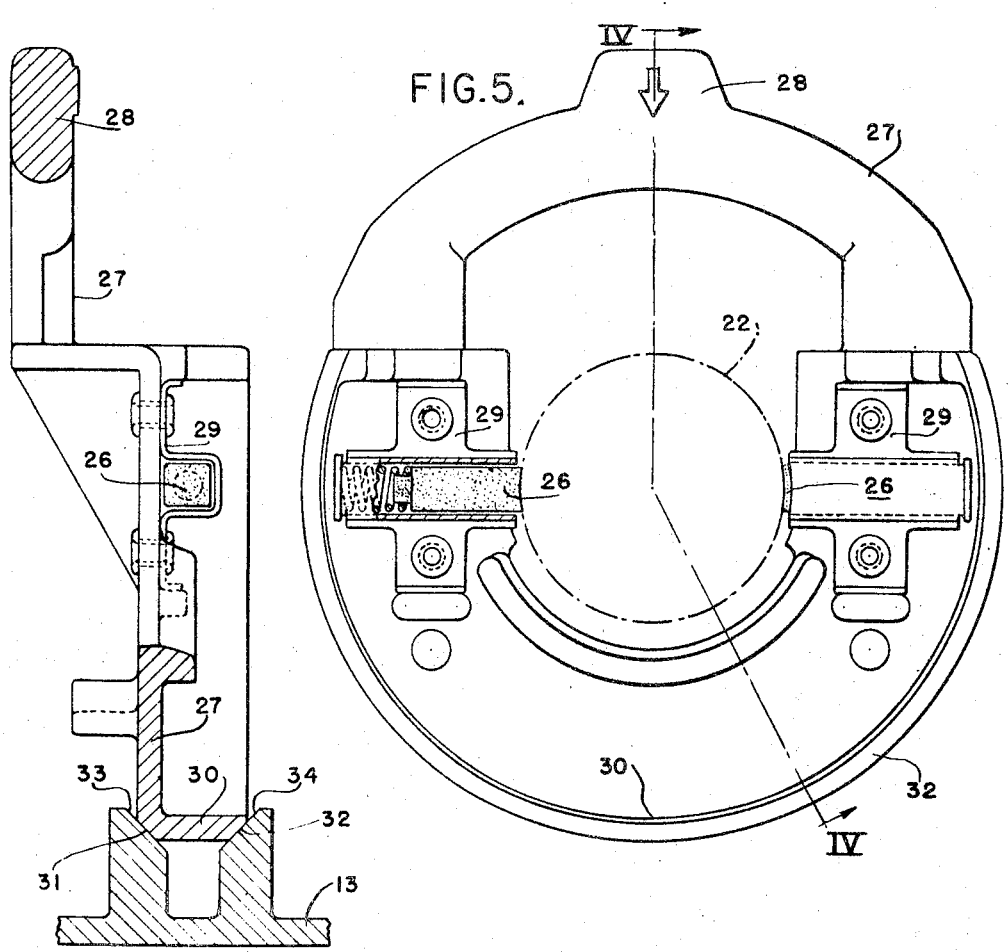
FIG. 5.
FIG. 4.
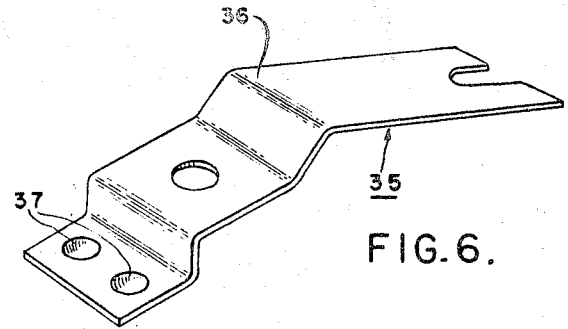
FIG. 6.
INVENTOR
GUSTAV H. KOCH
BY R. J. Eisinger
ATTORNEY

United States Patent Office 2,761,983
Patented Sept. 4, 1956

2,761,983

BRUSH SHIFTING DEVICE FOR CONTROLLING SPEED OF AN ELECTRIC MOTOR

Gustav H. Koch, Springfield, Mass., assignor to Westinghouse Electric Corporation, East Pittsburgh, Pa., a corporation of Pennsylvania Application June 24, 1955, Serial No. 517,821

2 Claims. (Cl. 310—40)

This invention relates to a brush shifting device for controlling the speed of an electric motor of the universal or commutator type, particularly a motor having a casing divided on a plane parallel to and closely adjacent the axis of rotation, the operating parts of the motor being secured to one of the casing parts and operable therein even upon removal of the other casing part or cover.

The object of the invention is to provide an improved brush shifting device, more particularly a brush shifting device for a motor of the type set forth above and which is adapted to control the speed of operation of the motor with the cover removed.

The terms "circular," "conical" and "cylindrical" are used in a broad sense in this specification to include a portion of a complete circumference.

In accordance with the invention, there is provided a brush holding ring having a circular surface or surfaces on its periphery, for example, frusto-conical surfaces. It is also provided with a concave surface, preferably a cylindrical surface. The lower casing part, to which the motor parts are secured, is provided with seats disposed along the circular periphery of the brush holding ring, and a spring associated with the lower casing part engages the concave curved surface of the ring to hold the latter against said seats.

These and other objects are effected by the invention as will be apparent from the following description taken in connection with the accompanying drawings, forming a part of this application, in which:

Fig. 4 is a vertical section, taken on the line IV—IV of Fig. 5, through the brush holding ring;

Fig. 5 is a side elevation of the brush holding ring; and

Fig. 6 is a perspective view of the spring for retaining the brush holding ring.

Figure 1:
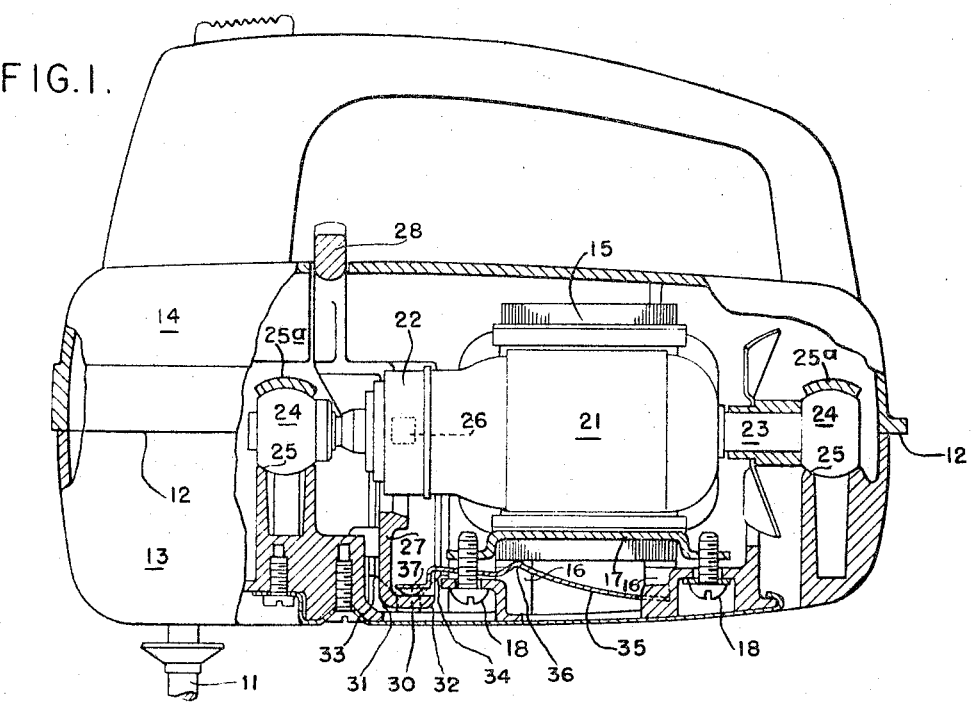
Fig. 1 is a side elevation, partly in longitudinal vertical section, of an electric motor incorporating my invention.
Figure 2:
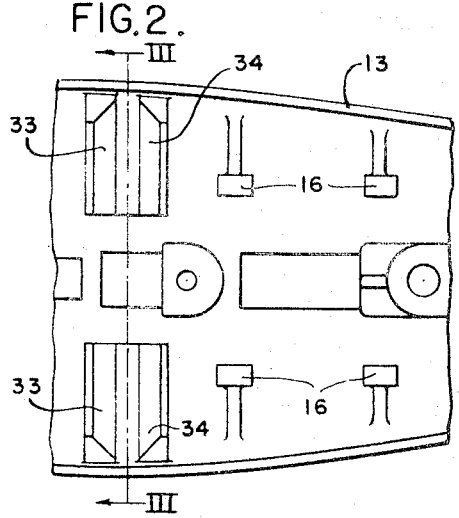
Fig. 2 is a fragmentary plan view of the lower casing part, showing the seats for the brush holding ring.
Figure 3:
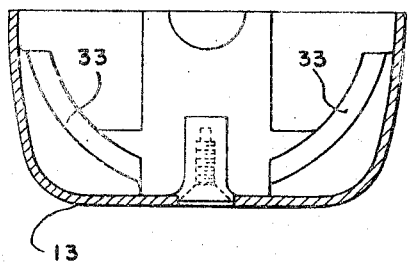
Fig. 3 is a vertical cross section taken on the line III—III of Fig. 2.

Referring to the drawings in detail, the invention is disclosed incorporated in a motor suitable for use in a small portable mixer for driving a pair of beaters 11. The motor has a casing which is divided on a horizontal plane 12 into a lower casing part 13 and an upper casing part or cover 14. The plane of division 12 is disposed parallel to and closely adjacent the axis of rotation, and, in the illustrated embodiment, it contains the axis of rotation.

All of the operating parts of the motor are mounted in the lower casing part 13 and are adapted to be operated for testing even though the cover 14 be removed. These parts include a stator core 15 which engages seats 16 formed in the lower casing part and is held down against such seats by a bar 17 extending through an opening in the stator core and held down by two screws 18. The rotor or armature 21 has a commutator 22 and a shaft 23. The latter is journalled in bearings 24, which are retained against seats 25 by bearing caps 26 attached to the lower casing part.

The motor further includes contact brushes 26 which engage the commutator 22. The motor is of a universal, commutator type whose speed is varied by rotating the brushes 26 relative to the stator core 15. Since motors of this type are well known in the art and since the present invention relates solely to the provision for adjusting these brushes, further description of the motor itself is not necessary.

The present invention provides a brush holding device which is operative and adapted to adjust the brushes 26 to permit the motor to operate with the cover 14 removed. The brush holding device includes a ring or ring-like member 27 encircling the commutator 22, the upper portion of the ring being offset forwardly and including a projecting portion 28 adapted to extend through a slot in the cover 14 so as to be conveniently adjusted by hand. Two brush holders 29 of any suitable form are riveted to the ring 27 and hold the brushes in diametrically opposed relation against the outer surface of the commutator. The ring 27 has a flange 30, at its periphery, which is provided with oppositely facing convex circular surfaces 31 and 32. In the illustrated embodiment, these faces are conical. The lower casing part 13 is formed with projections providing seats 33 and 34 that engage the surfaces 31 and 32, respectively. These seats are of a form complementary to the surfaces 31 and 32 and extend along arcs concentric with the axis of rotation.

To retain the ring 27 in position against its seats, a spring of any suitable form, for example, the leaf spring 35, shown in Figs. 1 and 6, is provided. The right-hand end of this spring bears downwardly against the bottom wall of the lower casing part 13, its intermediate point 36 bears upwardly against the lower surface of the stator core 15, and its left-hand end is formed with two downwardly embossed projections 37 that bear downwardly against the concave cylindrical surface on the inner side of the flange 30. The spring 35 is initially of the form shown in Fig. 6, so that when it is deflected by the above-mentioned parts to the position shown in Fig. 1, it exerts sufficient downward force on the flange 30 of the ring 27 to hold the ring in place.

To vary the speed of the motor, the projection 28 is engaged to rotate the ring in one direction or the other. This shifts the relation of the brushes relative to the stator core, thereby varying the speed in a manner already well known in the art.

The ring rotates about the axis of rotation, sliding relative to the circular or conical seats 33 and 34. Since it it attached solely to the lower casing part, it will be apparent that the brush holding device is operative to control the speed and that the motor will operate even though the cover 14 be removed. This facilitates observation and testing of the motor under actual operation.

While the invention has been shown in but one form, it will be obvious to those skilled in the art that it is not so limited, but is susceptible of various changes and modifications without departing from the spirit thereof.

What is claimed is:

1. In an electric motor, the combination of a casing divided on a plane disposed parallel to and closely adjacent the axis of rotation into a lower casing part and an upper casing part or cover, a stator core, a rotor including a commutator and a shaft, bearings for the rotor shaft, and a brush shifting ring carrying brushes engaging said commutator, the lower casing part being formed with seats against which said stator core, said bearings and said brush shifting ring are retained, said brush shifting ring being formed with a concave circular surface, and a spring operatively associated with said lower casing part and engaging said concave surface of said brush shifting ring to retain said ring against its seats while permitting the ring to rotate about the axis of rotation of the motor.

2. In an electric motor, the combination of a casing divided on a plane disposed parallel to and closely adjacent the axis of rotation into a lower casing part and an upper casing part or cover, a stator core, a rotor including a commutator and a shaft, bearings for the rotor shaft, and a brush shifting ring carrying brushes engaging said commutator, said ring having a convex circular surface or surfaces at its periphery and having a concave circular surface adjacent its periphery, the lower casing part being formed with seats against which said stator core and said bearings are retained, and also being formed with seats engaging said circular surface or surfaces and adapted to retain said ring in place but to permit rotation thereof about the axis of rotation of the motor, and a spring operatively associated with said lower casing part and engaging said concave surface of said brush shifting ring to retain the ring against its seats while permitting the ring to rotate.

No references cited.